(12) United States Patent
Alrashed (10) Patent No.: US 11,776,102 B2
(45) Date of Patent: Oct. 3, 2023

(54) PROGRAMMABLE PRODUCT ASSESSOR

(71) Applicant: KING ABDULLAH UNIVERSITY OF SCIENCE AND TECHNOLOGY, Thuwal (SA)

(72) Inventor: Mohammed Mansour Alrashed, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 522 days.

(21) Appl. No.: 16/799,085

(22) Filed: Feb. 24, 2020

(65) Prior Publication Data
US 2020/0273159 A1 Aug. 27, 2020

Related U.S. Application Data

(60) Provisional application No. 62/811,364, filed on Feb. 27, 2019.

(51) Int. Cl.
*G06T 7/00* (2017.01)
*G06Q 10/08* (2023.01)
(Continued)

(52) U.S. Cl.
CPC .......... *G06T 7/0004* (2013.01); *G06F 16/285* (2019.01); *G06Q 10/087* (2013.01); *G06T 7/97* (2017.01); *G06N 20/00* (2019.01); *G06T 2207/20081* (2013.01); *G06T 2207/30128* (2013.01)

(58) Field of Classification Search
None
See application file for complete search history.

(56) References Cited

U.S. PATENT DOCUMENTS

4,884,696 A 12/1989 Peleg
2013/0301902 A1* 11/2013 Oostendorp ......... G06K 9/6202
382/141
(Continued)

*Primary Examiner* — Edemio Navas, Jr.
(74) *Attorney, Agent, or Firm* — PATENT PORTFOLIO BUILDERS PLLC (57) ABSTRACT

A system includes a programmable assessor and a remote computer. The programmable assessor includes an assessment chamber, which includes an assessment platform and a sensor arranged to sense characteristics of a product on the assessment platform, as well as a processor coupled to the sensor and an input coupled to the processor. The remote computer includes a remote processor. The sensor is configured to sense characteristics of first and second versions of the product. The input is configured to receive a classification of the first and second versions of the product. The programmable assessor is configured to provide the sensed characteristics and classification of the first and second versions of the product to the remote processor. The remote processor is configured to generate an assessment program based on the sensed characteristics and classification of the first and second versions of the product, and to provide the generated assessment program to the programmable assessor. The processor of the programmable assessor is configured to execute the generated assessment program to assess and sort additional versions of the product.

20 Claims, 4 Drawing Sheets

(51) Int. Cl.
*G06F 16/28* (2019.01)
*G06Q 10/087* (2023.01)
*G06N 20/00* (2019.01)

(56) References Cited

U.S. PATENT DOCUMENTS

2017/0023490 A1* 1/2017 Ahlen .................... G01B 11/24
2018/0314866 A1* 11/2018 Kotula ................. G06K 9/6807
2019/0087631 A1* 3/2019 Lodewyckx .............. G06T 7/85

* cited by examiner

PROGRAMMABLE PRODUCT ASSESSOR

CROSS-REFERENCE TO RELATED APPLICATIONS

This application claims priority to U.S. Provisional Patent Application No. 62/811,364, filed on Feb. 27, 2019, entitled "PROGRAMMABLE ASSESSMENT MACHINE," the disclosure of which is incorporated herein by reference in its entirety.

BACKGROUND

Technical Field

Embodiments of the disclosed subject matter generally relate to a programmable product assessor, and more specifically to a product assessor that is programmable to assess products using personalized classifications.

Discussion of the Background

Automation of manual processes is commonly used to save costs and improve efficiency of the processes. Product assessment and sorting is one area in which automation is seen as achieving these goals. One area where product assessment and sorting is typically employed is in the field of food production and distribution. In this field, food, such as fruits and vegetables, are typically assessed using objective measures of the product, such as moisture content, color, shape, etc. Although the use of objective measures provides a uniform standard for assessment of the product, there are some products in which human subjective evaluation is superior to objective measures. Indeed, in many fields a producer or distributor of a product has a particular expertise with respect to a particular product that provides them with an advantage over other producers or distributors of the product. This can result in increased sales for the producer or distributor because the consuming public trusts the producer's or distributor's expertise in properly assessing the products. In this case, a product assessor programmed based on objective measures of the product will provide an inferior assessment compared to the producer or distributor employing their expertise.

Further, product assessors are typically standardized so that all of the product assessors produced by a particular manufacturer employ the same measures for assessing the products. Although this results in a standardized product assessment and sorting, it does not allow for any particular manufacturer or distributor to take advantage of their own expertise to provide a superior product assessment and sorting.

Moreover, conventional product assessors typically only assess a portion of the product because the product is carried through the product assessor on a platform, which prevents the sensor of the product assessor from assessing the portion of the product obscured by the platform.

Thus, there is a need for a product assessor that can employ personalized product assessment and sorting tailored to a producer's or distributor's expertise in product assessment. Further, there is a need to assess all surfaces of a product during the product assessment.

SUMMARY

According to an embodiment, there is a system, which includes a programmable assessor and a remote computer. The programmable assessor includes an assessment chamber, which includes an assessment platform and a sensor arranged to sense characteristics of a product on the assessment platform, as well as a processor coupled to the sensor and an input coupled to the processor. The remote computer includes a remote processor. The sensor is configured to sense characteristics of first and second versions of the product. The input is configured to receive a classification of the first and second versions of the product. The programmable assessor is configured to provide the sensed characteristics and classification of the first and second versions of the product to the remote processor. The remote processor is configured to generate an assessment program based on the sensed characteristics and classification of the first and second versions of the product, and to provide the generated assessment program to the programmable assessor. The processor of the programmable assessor is configured to execute the generated assessment program to assess and sort additional versions of the product.

According to another embodiment, there is a method for assessing product. A first version of the product is arranged on an assessment platform in an assessment chamber of a programmable assessor. A sensor in the assessment chamber senses characteristics of the first version of the product. A classification of the first version of the product is received from an input. The sensed characteristics and the classification of the first version of the product are stored in a memory. A second version of the product is arranged on the assessment platform. Characteristics of the second version of the product are sensed by the sensor. A classification of the second version of the product is received from the input. The sensed characteristics and the classification of the second version of the product are stored in the memory. The programmable assessor provides the stored sensed characteristics and classifications of the first and second versions of the product to a remote computer. The remote computer generates an assessment program based on the stored sensed characteristics and classifications of the first and second versions of the product. The remote computer provides the generated assessment program to the programmable assessor. The programmable assessor assesses additional versions of the product using the sensor and the generated assessment program. The programmable assessor sorts the additional versions of the product based on the assessment of the additional versions of the product.

According to a further embodiment, there is a programmable assessor, which includes an assessment chamber, which includes an assessment platform and a sensor arranged to sense characteristics of a product on the assessment platform, as well as a processor coupled to the sensor and an input coupled to the processor. The sensor is configured to sense characteristics of first and second versions of the product and provide the sensed characteristics to the processor. The input is configured to receive a classification of the first and second versions of the product and provide the sensed characteristics to the processor. The processor is configured to provide the sensed characteristics and classification of the first and second versions of the product to a remote processor. The remote processor is configured to generate an assessment program based on the sensed characteristics and classification of the first and second versions of the product, and to provide the generated assessment program to the processor of the programmable assessor. The processor of the programmable assessor is configured to execute the generated assessment program to assess and sort additional versions of the product.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of product assessors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
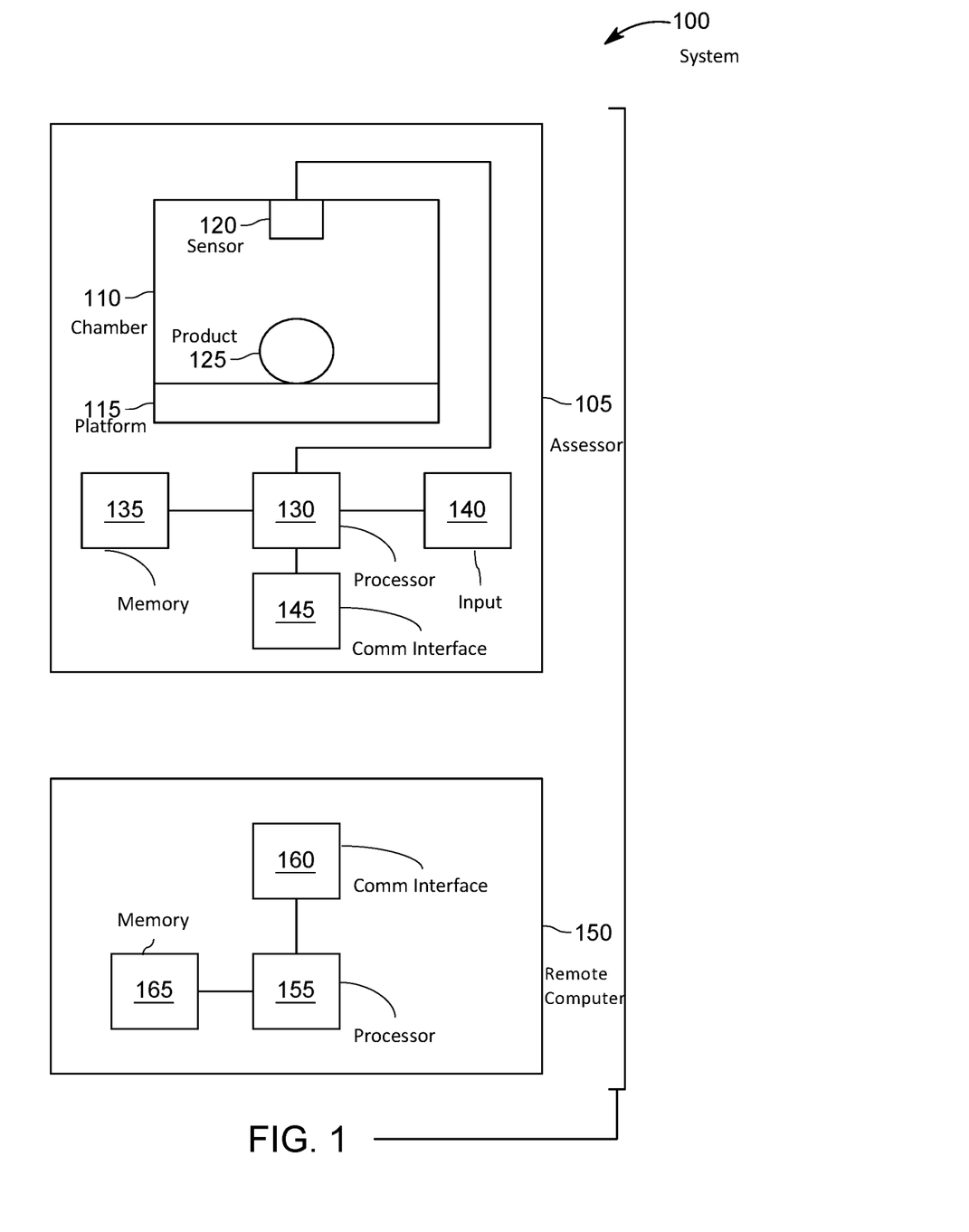
FIG. 1 is a schematic diagram of a system for product assessment and sorting according to embodiments.

FIG. 1 is a schematic diagram of a system for product assessment and sorting according to embodiments. The system 100 includes a programmable assessor 105 and a remote computer 150. The programmable assessor 105 includes an assessment chamber 110. The assessment chamber 110 includes an assessment platform 115 and a sensor 120 arranged to sense characteristics of a product 125 on the assessment platform 115. The programmable assessor 105 also includes a processor 130 coupled to the sensor 120 and an input 140 coupled to the processor 130. The remote computer 150 includes a remote processor 155.

The sensor 120 is configured to sense characteristics of first and second versions of the product 125. The input 140 is configured to receive a classification of the first and second versions of the product 125. The programmable assessor 110 is configured to provide the sensed characteristics and classification of the first and second versions of the product 125 to the remote processor 155. The remote processor 155 is configured to generate an assessment program based on the sensed characteristics and classification of the first and second versions of the product 125. The remote processor 155 is also configured to provide the generated assessment program to the programmable assessor 125. The processor 130 of the programmable assessor 105 is configured to execute the generated assessment program to assess and sort additional versions of the product 125. This can involve, for example, matching captured characteristics of the additional versions of the product 125 against captured characteristics of the first and second versions of the product 125, and classifying the additional versions of the product based on the matching.

The input 140 allows for a person to provide their own personalized, subjective assessment classifications of different versions of a product, and thus the generated assessment program is tailored to that person's personalized, subjective assessment classifications. This allows a person to employ their own expertise in the assessment classifications without having to employ the same objective classifications as others using the assessor.

Further, generating the assessment program can be very resource intensive, and accordingly the processing power required to be provided in the programmable assessor 105 need only be sufficient for the subsequent assessments and sorting of the additional versions of the product because the large processing power need only be provided in the remote computer 150 to generate the assessment program. Specifically, processor 155 of remote computer 150 can be a high-powered processor capable of using, for example, artificial intelligence, computer vision, and/or image processing, to generate the assessment program. It will be recognized that the assessment program can be generated using any type of object or source code that is designed to recognize the characteristics of the products that are subject to the assessment using the sensor 120 using any type of technique. The assessment of products involves detecting features of products and classifying the product based on the detected features and/or matching the detected features against features of the first and/or second products, which can involve using neural networks (such as convolutional neural networks (CNN)), deep learning, rule-based machine learning (RBML), decision tree learning, k-means classification, linear regression, logistic regression, linear classification, Bayesian networks, reinforcement learning, principle component analysis (PCA) learning, non-parametric (memory-based) learning, support vector machine, unsupervised learning classification, corner detection algorithms (e.g., Harris corner detector, the features from accelerated segment test (FAST), scale-invariant feature transform (SIFT), Shi-Tomasi corner detector, etc.), the speeded up robust features (SURF) method, the binary robust independent elementary features (BRIEF) method, the oriented FAST and rotated BRIEF algorithm (ORB) method, the binary robust invariant scalable keypoints (BRISK) methods, the maximally stable extremal regions (MSER) method, the color gradient histogram features descriptor method, the histogram of oriented feature descriptor method, the histogram of oriented gradients (HOG) feature descriptor method, the vantage point tree method, the KAZE features method, and/or the like. One skilled in the art will be familiar with all of these techniques and can implement any of these techniques to assess and sort products in the manner described herein.

The input 140 can be any type of input. For example, when the programmable assessor is employed for assessing and sorting different grades of a product, the input 140 can provide a set of grading selections, such as via a touchscreen, keyboard, mechanical buttons, etc. However, the input 140 can provide any type of mechanism for designating a classification for a particular version of a product. It should be recognized that different versions of a product include a quality measure of a common product and/or different types of a product. Specifically, using the sorting of dates as a non-limiting example, the different versions of the product can be different versions of quality of a particular type of date and/or the different versions can be different types of dates. Thus, the programmable assessor 105 can assess and sort a particular type of date based on different qualities, different types of dates based on the type of date, and/or different types of dates based on the type of data and particular types of dates based on different qualities. Further, the programmable assessor 105 can assess products that do not match the characteristics defined in the assessment program and separately sort these products (even if these are not the same types or quality of products) from products that do match the characteristics defined in the assessment program.

Referring again to FIG. 1, the programmable assessor 105 can also include a memory 135 coupled to the processor 130 and a communication interface 145 coupled to the processor 130. Similarly, the remote computer 150 can also include a remote communication interface 160 and a remote memory 165, both of which are coupled to the remote processor 155. The processors 130 and 155 can be any type of processor, including a microprocessor, field programmable gate array (FPGA), application specific integrated circuit (ASIC), etc. Further, the memories 135 and 165 can be any type of static or dynamic memory. In some cases, the memory 135 and/or 165 can be integrated in the respective processor 130 and/or 155. Memories 135 and 165 can store programs that are executed by the respective processors 130 and 155 to perform the functions disclosed herein. Furthermore, memories 135 and 165 can store data, such as the classifications of the different versions of the product and the corresponding sensed characteristics of the product.

The communication interfaces 145 and 160 can be any type of communication interface allowing the exchange of data between the programmable assessor 105 and remote computer 150. This includes wireless and wired communication interfaces (e.g., Wi-Fi, ethernet, cellular, etc.), as well as interfaces for exchanging the data using a portable storage medium, such as a USB interface for connecting a flash drive or hard drive to the communication interfaces 145 and 160. Thus, the provision of the sensed characteristics and classification of the first and second versions of the product 125 can be provided by the programmable assessor 105 to the remote computer 150 via communication interfaces 145 and 160.

As will be discussed in more detail below in connection with FIG. 4, the assessment platform 115 is configured to adjust an orientation of the first and second versions of the product 125 relative to the sensor 120 while the sensor 120 senses characteristics of the first and second versions of the product 125. In one embodiment, this can be achieved using rollers.

Although FIG. 1 illustrates a single sensor 120 arranged above the assessment platform 115, the programmable assessor 105 can include alternative or additional sensors arranged in different locations. The sensor(s) 120 are selected based on the types of characteristics used for classifying the product 125. In one embodiment, the sensor 120 is an imager that senses one or more images of the product 125 on the assessment platform 115. In this case, the sensed characteristics of the product 125 can include, for example, color, size, texture, shape, etc.

Returning to the non-limiting example above in which the product 125 is dates, the programmable assessor 105 can be used to assess and sort different types of dates (e.g., Barhi, Medjool, Ajwa, Sukkari, etc.) according to quality. This can involve sorting different qualities of the same type of date, sorting different types of dates, or sorting different types of dates and within the different types, sorting based on quality. In some embodiments, the programmable assessor 105 can be programmed to perform two or all three of the different type of sorting described above, which provides flexibility to the user to provide the programmable assessor 105 with different types of a product, different qualities of one type of a product, or different types of products with differing qualities within the different types.

When the assessment platform includes rollers, the orientation of the product 125 relative to the imager is adjusted so that substantially all (or all) of the outer surfaces of the product 125 are exposed to the imager so that the imager or the processor 130 of the programmable assessor 105 generates a three-dimensional image of the product 125. Although the system has been described as employing only first and second versions of the product in connection with the classification using the input, as will be appreciated from the discussion of the method illustrated in FIG. 2, this can involve more than two versions of the product. This allows a user to define any arbitrary number of classifications for different versions of a product.

A method for product assessment and sorting according to embodiments will now be described in connection with FIG. 2. Initially, a first version of the product 125 is arranged on an assessment platform 115 in an assessment chamber 110 of a programmable assessor 105 (step 205). Characteristics of the first version of the product 125 are sensed using a sensor 120 in the assessment chamber 110 (step 210). A classification of the first version of the product 125 is received from an input 140. This classification can also be referred to as labeling because a label (i.e., a name, alphabetical descriptor, and/or numerical descriptor) is associated with the classification, which is subsequently employed to sort further versions of the product into the appropriate container. The sensed characteristics and the classification of the first version of the product 125 are stored in a memory 135 of the programmable assessor 105 (step 215). If there are additional versions of the product ("Yes" path out of decision step 225), then steps 205-220 are repeated for each additional version. In some embodiments, additional versions of the product are not employed. For example, it may be desired to assess and identify different versions of a product so that only one version is sorted separately from any other version. In this case, it is only necessary to sense characteristics and a classification of that one version and the assessment will result in sorting the different versions based on whether the additional versions possess the characteristics of that one version. Any version not possessing those characteristics can be commonly sorted and separately sorted from the one version.

Assuming that there is at least one additional version of the product 125, referred to herein as a second version, the second version of the product 125 is arranged on the assessment platform 115 (step 205), the sensor 120 senses characteristics of the second version of the product 125 (step 210), a classification of the second version of the product 125 is received from the input 140 (step 215), and the sensed characteristics and the classification of the second version of the product 125 are stored in memory 135 (step 220).

If there are no additional versions of the product ("No" path out of decision step 225), then the stored sensed characteristics and classifications of the first and second versions of the product 125 (as well as any further versions of the product that were classified using steps 205-220) are provided by the programmable assessor 105 to a remote computer 150 (step 230). The remote computer 150 generates an assessment program based on the stored sensed characteristics and classifications of the first and second versions of the product 125 (step 235). The remote computer 150 provides the generated assessment program to the programmable assessor 105 (step 240). The programmable assessor 105 assess additional versions of the product 125 using the sensor 120 and the generated assessment program (step 245). The programmable assessor 105 sorts the additional versions of the product 125 based on the assessment of the additional versions of the product 125 (step 250).

Figure 2:
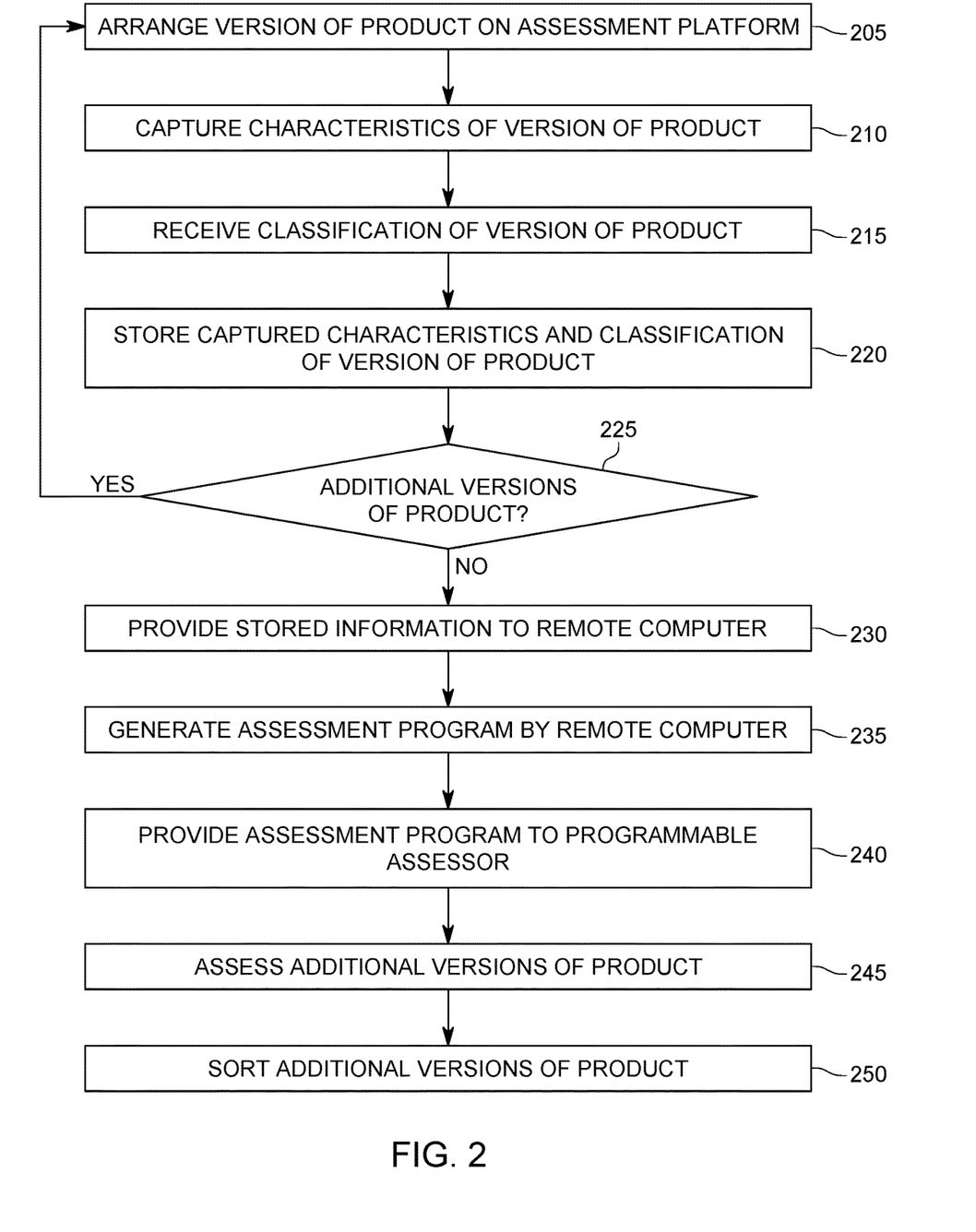
FIG. 2 is a flowchart of a method for product assessment and sorting according to embodiments.

For ease of explanation, and not limitation, the flowchart of FIG. 2 illustrates the assessing and sorting in additional versions of the product in consecutive steps 245 and 250. However, the assessment and sorting can, but need not, be performed at the same time for each of the additional versions of the product. Thus, for example, these steps can involve assessing and sorting a number of versions of the product that are on the assessment platform 115 at the same time and/or can involve serially assessing and sorting the number of versions of the product in which only one version is on the assessment platform 115 at any given time.

As will be appreciated by those skilled in the art, steps 205-225 can be considered as a training process that associates classifications with captured features. This training process, however, need not be performed by each user. Instead, users can obtain assessment programs generated based on training processes performed by other users. For example, the remote computer 150 can store each assessment program that it generates, for example, in a library in remote memory 165. This allows users to select and download an assessment program without having to perform the necessary steps to classify products based and associate the classification(s) with captured characteristics (i.e., steps 205-225). Thus, a user can generate have their own assessment program generated based on the user's classification and/or the user can obtain an assessment program based on classifications made by other users.

Figure 3:
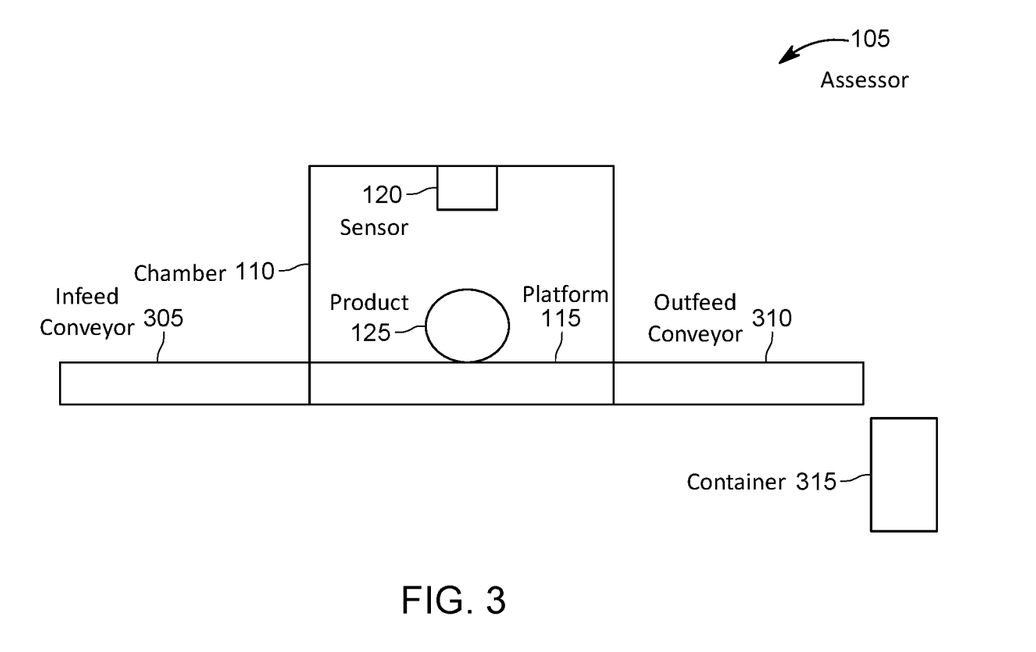
FIG. 3 is a schematic diagram of a product assessor according to embodiments.

Additional details of the programmable assessor 105 will now be described in connection with FIGS. 3 and 4, in which some elements of the programmable assessor are omitted for sake of clarity. Turning first to FIG. 3, the programmable assessor 105 can include an infeed conveyor 305 configured to provide products 125 to the assessment chamber 110 of the programmable assessor 105. Further, the programmable assessor can also include an outfeed conveyor 310 configured to move products 125 from the assessment chamber 110 into one or more containers 315. Specifically, based on the assessment of the additional versions of the product 125, the programmable assessor 105 can classify the additional versions of the product 125 based on a matching of the characteristics of the additional versions against the characteristics employed to generate the assessment program and then sort the additional versions of the product 125 in the corresponding container 315. After the assessment of a product, the sorting can be performed in the assessment chamber 110 and/or on the outfeed conveyor 310 using any known sorting mechanism so that products sharing common characteristics defined in the assessment program are sorted together and sorted separate from products not having those common characteristics.

Figure 4:
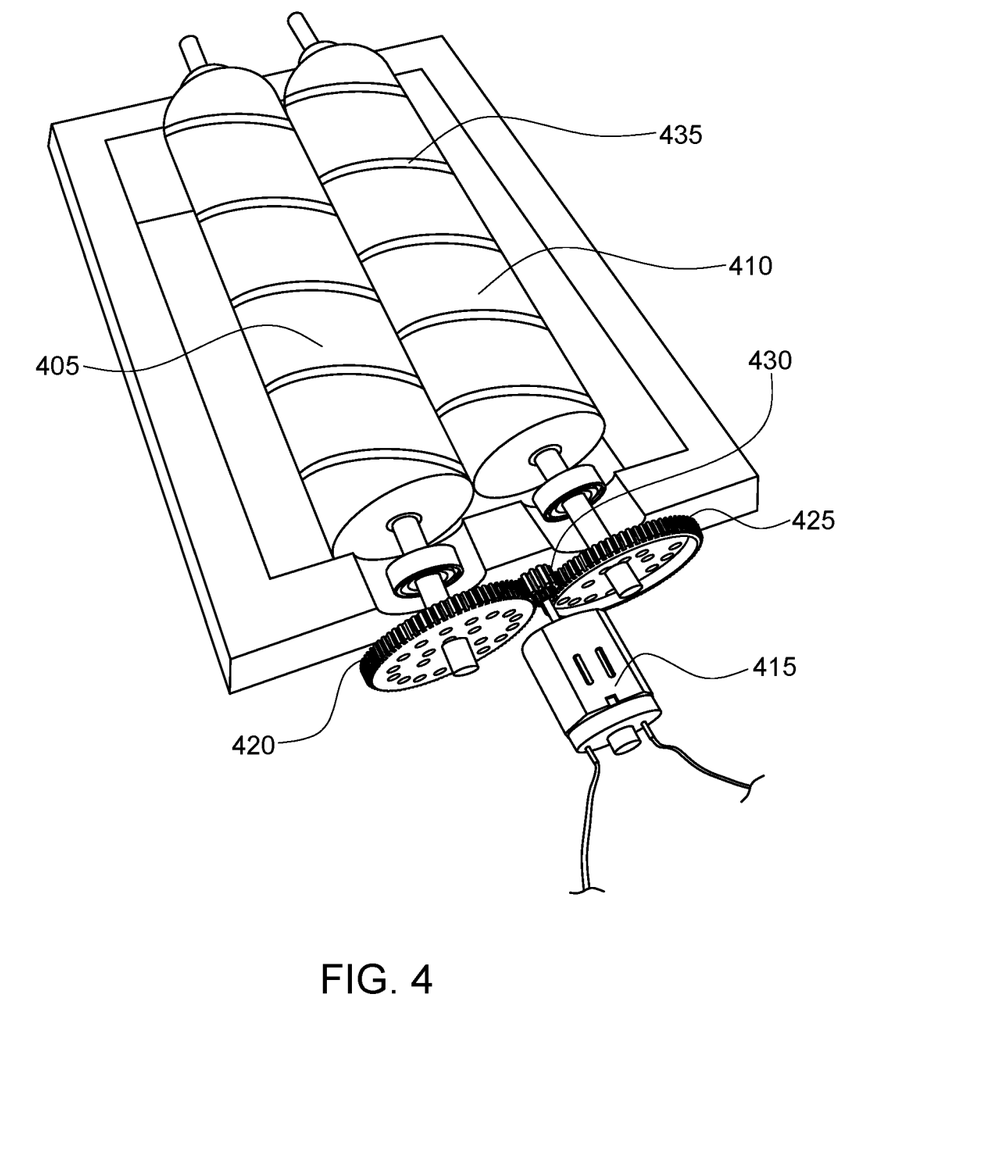
FIG. 4 is a schematic diagram of a platform for a product assessor according to embodiments.

FIG. 4 illustrates a more detailed view of the assessment platform 115. Specifically, the assessment platform 115 includes first 405 and second 410 rollers arranged adjacent to each other and have parallel axis of rotation. The assessment platform 115 also includes a motor 415 to drive the first 405 and second 410 rollers. The motor can be any type of motor, including an electric motor, gas-powered motor, or a pneumatic motor. Those skilled in the art will appreciate that a pneumatic motor is one that employs pneumatic energy (e.g., compressed air) to power the motor. This can involve storing compressed air and routing the compressed air to a sealed motor chamber of the pneumatic motor. Expelling of the compressed air causes the rotor of the motor to turn. The motor's flywheel can then be turned by this expelled air (or can be turned by a pinion gear when high torque levels are created by reduction gears).

In the illustrated example, the first 405 and second 410 rollers include a gear 420 and 425, respectively, which engage with a gear 430 of the motor 415. It should be recognized, however, that the motor 415 can be configured to directly drive the first 405 and second 410 rollers, or additional gears can be employed. The rollers also include one or more features for moving the product 125 along the axis of rotation while the product is being rotated. In the illustrated example, the rollers 405 and 410 include a spiral edge 435 to move the product 125 along its axis of rotation while the product is being rotated. The rotatable rollers 405 and 410 can be made of any material, such as rubber material, which provides sufficient friction with the product 125 so that rotation of the rollers 405 and 410 cause the product 125 to rotate.

Configuring the assessment platform to include rotatable rollers 405 and 410 is particularly advantageous because it exposes substantially all (or all) of the surfaces of the product 125 to the sensor. In contrast, conventional assessment platforms typically employ carriers that obscure portions of the product to be assessed.

The assessment platform 115 is illustrated as including only two rollers for ease of illustration and should not be considered limiting. Specifically, the assessment platform 115 can include more than two rollers. In a non-limiting example, the assessment platform 115 can include three rollers (A, B, C) and two sensors (120AB and 120BC). Similar to the arrangement in FIG. 4, the three rollers A, B, and C are arranged adjacent to each over and have a parallel axis of rotation. A sensor is arranged to capture characteristics of products 125 placed between two adjacent rollers, which in the illustrated example would involve sensor 120AB being arranged to capture characteristics of a product 125 on rollers A and B and sensor 120BC being arranged to capture characteristics of a product 125 on rollers B and C. Thus, the assessment platform can include N sensors and N+1 rollers. Expanding the number of rollers expands the capacity of the assessment machine to assess and sort more than one product 125 at a time. It should be recognized that when the programmable assessor 105 includes more than one sensor to sense different characteristics of the product 125, each of the N sensors would comprise the more than one sensor. For example, if two different sensors are used to sense different characteristics, then each N sensor would comprise the two different sensors.

The disclosed system and method can be employed with any type of product, including organic products (e.g., fruit and/or vegetables), as well as inorganic products (e.g., recycled material). Assessing and sorting both organic and inorganic products is typically a very human-resource-intensive task, which is significantly less expensive and more efficient when the assessing and sorting is performed by the disclosed programmable assessor. Further, manually assessing and sorting of products is subject to the judgement of the particular person performing this manual task, and thus results in variances in the assessment and sorting from one person to the next. In contrast, because the disclosed systems and methods provide a uniform assessment and classification, and also an assessment and classification according to the standards of a person that is particularly expert in the assessment of particular products.

The disclosed systems and methods also particularly advantageous because the assessment program can be updated at any time by sensing characteristics of additional products (or versions of a product) and classifying the additional products (or versions of the product). This is useful in a number of settings, including in the assessment and sorting of organic matter because the desired and undesired characteristics of organic matter can change over time, either due to changing consumer preferences or changes in the products themselves. Further, the updating can be performed to add characteristics that were not part of a previous version of the assessment program, to remove characteristics that were part of a previous version of the assessment program, and/or to adjust the classification of a particular characteristic (e.g., adjusting a size range for a particular classification, adjusting a range of coloring for a particular classification, adjusting a texture range for a particular classification, etc.).

The disclosed embodiments provide a product assessment system, method for assessing products, a product assessment platform, and a product assessor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system, comprising:
    a programmable assessor, comprising
        an assessment chamber, which includes an assessment platform and a sensor arranged to sense characteristics of a product on the assessment platform;
        a processor coupled to the sensor;
        an input coupled to the processor; and
        a remote computer comprising a remote processor,
    wherein the sensor is configured to sense characteristics of first and second versions of the product,
    wherein the input is configured to receive a classification of the first and second versions of the product,
    wherein the programmable assessor is configured to provide the sensed characteristics and classification of the first and second versions of the product to the remote processor,
    wherein the remote processor is configured to generate an assessment program based on the sensed characteristics and classification of the first and second versions of the product, and to provide the generated assessment program to the programmable assessor, and
    wherein the processor of the programmable assessor is configured to execute the generated assessment program to assess and sort additional versions of the product.

2. The system of claim 1, wherein the assessment platform is configured to adjust an orientation of the first and second versions of the product relative to the sensor while the sensor senses characteristics of the first and second versions of the product.

3. The system of claim 2, wherein the sensor comprises N sensor(s) and the assessment platform comprises N+1 rollers, wherein the N+1 rollers are arranged adjacent to each other and have parallel axis of rotation.

4. The system of claim 3, wherein the assessment platform further comprises a motor coupled to the N+1 rollers.

5. The system of claim 1, wherein the programmable assessor further comprises an infeed conveyor configured to provide products to the assessment chamber of the programmable assessor.

6. The system of claim 1, wherein the programmable assessor further comprises an outfeed conveyor configured to move products from the assessment chamber into containers.

7. The system of claim 1, wherein the sensor comprises an imager configured to sense visual characteristics of the product on the assessment platform.

8. The system of claim 7, wherein the generated assessment program includes artificial intelligence, computer vision, or image processing algorithms for classification of the additional versions of the product.

9. The system of claim 1, wherein the sensor comprises a plurality of sensors arranged to sense different characteristics of the product on the assessment platform.

10. The system of claim 1, wherein the sensed characteristics of the product include texture, color, size, and shape of the product.

11. A method for assessing product, the method comprising:
    arranging a first version of the product on an assessment platform in an assessment chamber of a programmable assessor;
    sensing, using a sensor in the assessment chamber, characteristics of the first version of the product;
    receiving, from an input, a classification of the first version of the product;
    storing, in a memory of the programmable assessor, the sensed characteristics and the classification of the first version of the product;
    arranging a second version of the product on the assessment platform;
    sensing, using the sensor, characteristics of the second version of the product;
    receiving, from the input, a classification of the second version of the product;
    storing, in the memory, the sensed characteristics and the classification of the second version of the product;
    providing, by the programmable assessor to a remote computer, the stored sensed characteristics and classifications of the first and second versions of the product;
    generating, by the remote computer, an assessment program based on the stored sensed characteristics and classifications of the first and second versions of the product;
    providing, by the remote computer to the programmable assessor, the generated assessment program;

assessing, by the programmable assessor, additional versions of the product using the sensor and the generated assessment program; and sorting, by the programmable assessor, the additional versions of the product based on the assessment of the additional versions of the product.

12. The method of claim 11, further comprising:

adjusting, by the assessment platform, an orientation of the first and second versions of the product while the sensor senses characteristics of the first and second versions of the product.

13. The method of claim 11, wherein the sensor comprises N sensor(s) and assessment platform comprises N+1 rollers, wherein the N+1 rollers are arranged adjacent to each other and have parallel axis of rotation, and wherein the N+1 rollers rotate about the parallel axis of rotation to adjust the orientation of the first and second versions of the product.

14. The method of claim 11, wherein the sensor comprises a plurality of sensors arranged to sense different characteristics of the product on the assessment platform.

15. The method of claim 11, wherein the sensed characteristics of the product include texture, color, size, and shape of the product.

16. A programmable assessor, comprising:

an assessment chamber, which includes an assessment platform and a sensor arranged to sense characteristics of a product on the assessment platform;

a processor coupled to the sensor;

an input coupled to the processor, wherein the sensor is configured to sense characteristics of first and second versions of the product and provide the sensed characteristics to the processor, wherein the input is configured to receive a classification of the first and second versions of the product and provide the sensed characteristics to the processor, wherein the processor is configured to provide the sensed characteristics and classification of the first and second versions of the product to a remote processor, wherein the remote processor is configured to generate an assessment program based on the sensed characteristics and classification of the first and second versions of the product, and to provide the generated assessment program to the processor of the programmable assessor, and wherein the processor of the programmable assessor is configured to execute the generated assessment program to assess and sort additional versions of the product.

17. The programmable assessor of claim 16, wherein the assessment platform is configured to adjust an orientation of the first and second versions of the product relative to the sensor while the sensor senses characteristics of the first and second versions of the product.

18. The programmable assessor of claim 17, wherein the sensor comprises N sensor(s) and the assessment platform comprises N+1 rollers, wherein the N+1 rollers are arranged adjacent to each other and have parallel axis of rotation.

19. The programmable assessor of claim 16, wherein the sensor comprises an imager configured to sense visual characteristics of the product on the assessment platform.

20. The programmable assessor of claim 16, wherein the sensed characteristics of the product include texture, color, size, and shape of the product.

* * * * *